United States Patent

[11] 3,628,444

[72] Inventor Lamberto Mazza
  Pordenone, Italy
[21] Appl. No. 881,763
[22] Filed Dec. 3, 1969
[45] Patented Dec. 21, 1971
[73] Assignee Kantor International S.A.
  Luxemburg, Luxembourg
[32] Priority Dec. 18, 1968
[33] Italy
[31] 25275 A/68

[54] MACHINE FOR THE PRODUCTION OF AERATED BEVERAGES FROM PREFABRICATED CARTRIDGES CONTAINING FLAVORING SUBSTANCES
17 Claims, 3 Drawing Figs.

[52] U.S. Cl. .................................................... 99/275, 99/295
[51] Int. Cl. .................................................... A23i 1/00
[50] Field of Search ........................................ 99/275, 276, 277.2, 234, 295; 259/48, 60, 61, 64, 67, 66, 18, 19; 222/82, 83.5, 86

[56] References Cited
UNITED STATES PATENTS

| | | | |
|---|---|---|---|
| 2,462,019 | 2/1949 | Bowman | 99/275 |
| 3,292,527 | 12/1966 | Stasse | 99/295 |
| 3,326,531 | 6/1967 | Matheson | 259/67 |
| 3,403,617 | 10/1968 | Lampe | 99/295 |

*Primary Examiner*—Robert W. Jenkins
*Attorney*—Holman & Stern

ABSTRACT: A machine for the production of aerated beverages, employing the method of dissolving a flavoring (and/or sweetening) substance sealed in a cartridge with an aqueous liquid in which the aerated liquid medium, usually carbonated water, is first fed to a vessel underlying the cartridge, after which the cartridge is pierced and the substances contained therein fall into the vessel which already holds the aerated or carbonated liquid medium. The machine can also be used in the conventional manner for the preparation of "flat" beverages by cutting off the aerated liquid-medium feed.

PATENTED DEC 21 1971
3,628,444
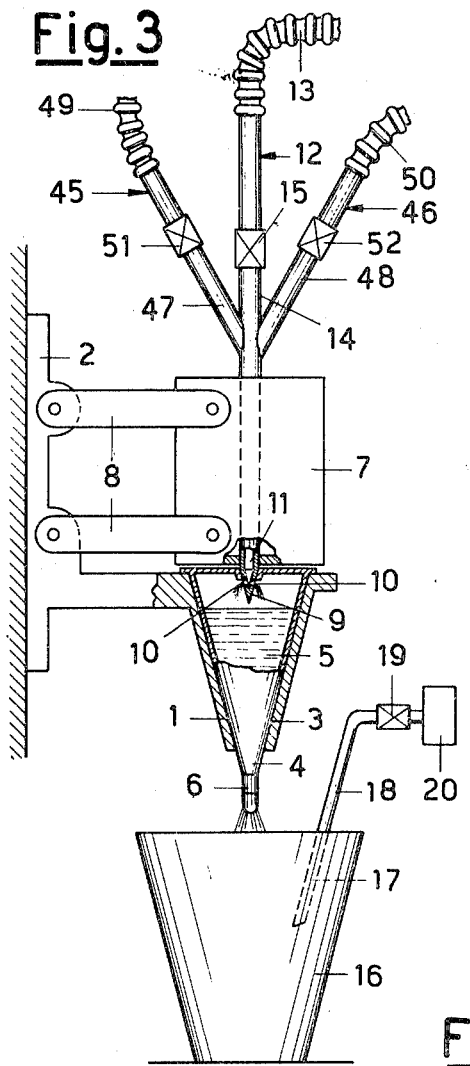
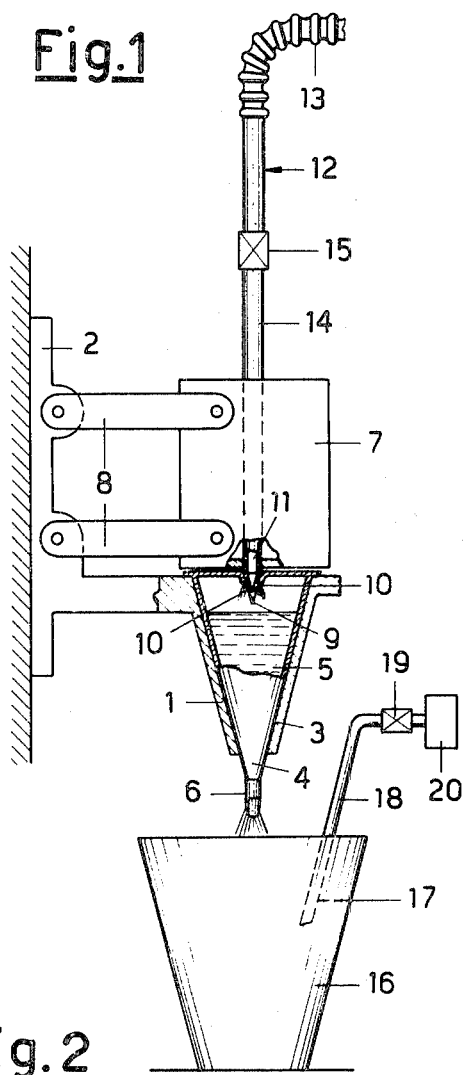
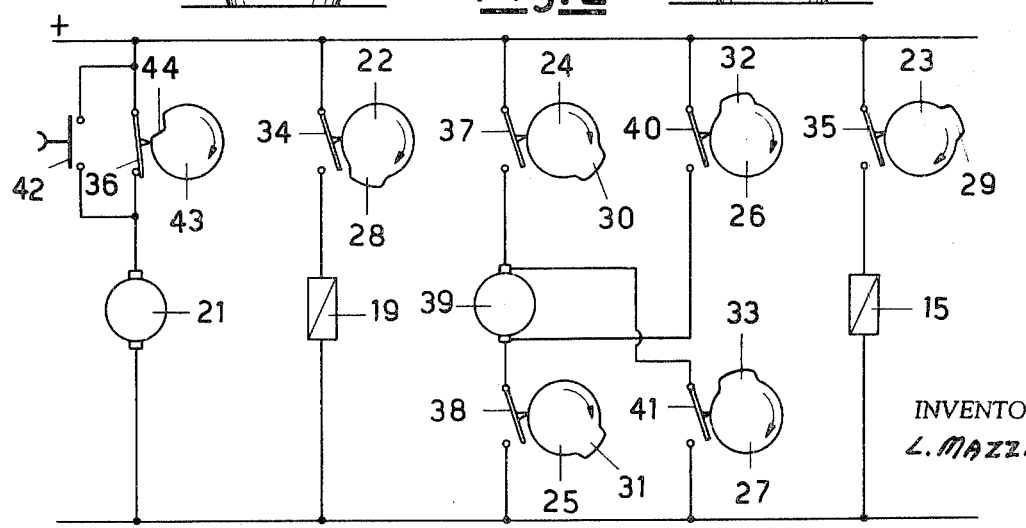
INVENTOR
L. MAZZA
BY Holman, Glascock, Downing &
Sobold
ATTORNEYS

MACHINE FOR THE PRODUCTION OF AERATED BEVERAGES FROM PREFABRICATED CARTRIDGES CONTAINING FLAVORING SUBSTANCES

BACKGROUND OF THE INVENTION

This invention has as its subject matter a machine for producing aerated beverages starting from prefabricated cartridges which contain flavoring substances.

Machines are known for producing hot or cold beverages, with such machines providing for the use of sealed cartridges containing flavoring substances, either in a liquid or powdery condition, as supported by an appropriate supporting structure and which are opened at the time when a beverage is being brewed while an appropriate liquid is caused to flow therethrough, such as hot water when brewing coffee, hot milk when brewing French milk-and-coffee, and cold water when cold beverages are being produced. The liquid is fed under such a pressure as to enable it to entrain therewith the whole contents of the cartridge so as to dissolve it or brew an infusion in order that the desired beverage may be obtained.

The operability of the known machines, however, is not satisfactory when the production of aerated beverages is in question. As a matter of fact, in such a case, the shortcoming is experienced that the contact of the carbonated water, generally fed in under high-pressure, with the sugary substances admixed to the flavors contained in the cartridges, originates the formation of bulky undesirable foamy masses.

An object of the present invention is to provide a machine which permits aerated beverages to be produced starting from flavor-containing cartridges without meeting with the above-indicated shortcoming of the formation of foamy masses.

SUMMARY OF THE INVENTION

This object is achieved according to the invention by a machine characterized in that it comprises a supporting member for a cartridge containing flavoring substances to be admixed with carbonated water for the production of a drink, a collecting vessel situated beneath the cartridge, means for directly feeding carbonated water into the collecting vessel and means for punching the upper end of the cartridge and feeding thereinto a fluid to enable the flavoring substance to be fed out of the cartridge and to fall into the collecting vessel after the carbonated water has been directly fed thereinto.

The thrust can be imparted to the flavoring substance either by a pressurized fluid (such as carbon dioxide or compressed air) or by water at main pressure or also, if the substance in question is sufficiently fluid, by the gravity pull itself if the interior of the cartridge is caused to communicate, both at the top and bottom, with atmospheric pressure. The use of either thrust means or of a combination thereof is a function of the density of the substance contained in the cartridge, the kind of beverage to be prepared, the necessity of directing more or less vigorously the substance into the carbonated water to which it is to be admixed and finally the availability of the thrust means per se. Their application is preferably obtained by providing the punching tool with a passageway which communicates with the means for feeding the selected means. As has been seen, this can even be atmospheric air.

In addition, the machine according to the invention can be equipped with other ducts for pressurized liquids (such as hot and cold water) adapted to produce nonaerated beverages in the usual manner for machines of this kind.

An additional feature of the invention is that of providing for the cartridge such a housing that the lower end of the cartridge may protrude from the supporting structure in such a way that the substances which emerge from the cartridge fall into the collecting vessel without contacting any part of the machine. By so doing, the several parts of the machine remain constantly clean and dry and the production of beverages can take place sequentially without any machine-cleaning operation being necessary, with the only required manipulation being the mere replacement of the spent cartridge.

The features of the present invention will be better understood from the ensuing description of two preferred embodiments thereof.

BRIEF DESCRIPTION OF THE DRAWINGS

In this detailed description, given only as an example of the invention, reference will be had to the accompanying drawing, wherein:

FIG. 1 is a view in elevation and partly in section of a machine according to the invention for the production of aerated beverages, FIG. 2 is a diagrammatic view of an embodiment exemplifying a control circuit for a machine as shown in FIG. 1, and FIG. 3 is a view similar to that shown in FIG. 1 but of a machine equipped with feeding ducts for hot and cold water adapted to permit the brewing of infusions and aerated beverages.

DETAILED DESCRIPTION OF THE DRAWINGS

The machine shown in FIG. 1 comprises a supporting member 1 which is fastened in an overhanging fashion to framing 2 of the machine. The member 1 has a frustoconical through-hole or bore 3 which defines a supporting space for a cartridge 4 containing a liquid-flavoring substance 5 such as lemon sirup.

The sizes of the space 3 and cartridge 4 are such as to cause the outer lateral surface of the cartridge 4 to adhere closely to the walls of the space 3 and, in addition, to cause the lower end of the cartridge, having an extension 6, to project or extend from the space.

Above the cartridge 4 is a punching tool 7 hingedly connected with the framing 2 by means of connecting links or arms 8 and the tool is provided with a needle 9 adapted to punch the upper face of the cartridge as the punching tool 7, starting from a lifted position, is brought to the position shown in FIG. 1 under the action of an appropriate motive member (not shown). The needle 9 has side perforations 10 which establish communication between the atmosphere and a central bore 11 which extends throughout the entire length punching tool and opens into a duct 12. The duct 12 has a flexible portion 13 and a stiff or rigid portion 14 equipped with a cutoff magnetic valve 15 and is adapted to feed the central bore 11 of the punching tool with a pressurized gas (such $CO_2$, compressed air) or with water at the pressure of the main, to establish a communication between the bore and the atmosphere directly, or to provide the central bore with a feeding stream composed of a combination of the above mentioned feeds.

Beneath the cartridge 4, a collecting vessel 16 is installed, in which the outlet spout 17 of a duct 18 is inserted, and the duct 18 has a cutoff magnetic valve 19 adapted to control the flow to the vessel 16 of carbonated water drawn from a suitable reservoir 20.

FIG. 2 shows one of the possible control circuits which can be used for an automatic operation of the machine depicted in FIG. 1. As viewed in FIG. 2, the feeding current for a motor 21 is taken from two DC lines having opposite polarities (indicated at + and −) through the parallel insertion of a pushbutton 42 and a switch 36, with the latter being kept engaged by a cam 43 having a recess 44, and the motor 21 is adapted to drive at the same speed and in the the directions shown by the respective arrows, six cams 22, 23, 24, 25, 26 and 27, each having a respective peripheral projection such as 28, 29, 30, 31, 32 and 33.

The peripheral surface of the cam 22 is kept in engagement with a switch 34 serially connected with the magnetic valve 19 between the two feeding mains. The peripheral surface of the cam 23, in turn, is kept in engagement with a switch 35 serially connected with the magnetic valve 15 between the two feeding mains.

The peripheral surfaces of the cams 24 and 25 are then kept in engagement with two switches 37 and 38 serially connected with a motor 39 for driving the punching tool 7, one on the one side and the other side, between two feeding lines. More precisely, the switch 37 connects to the positive leg the first terminal of the motor 39, whereas the switch 38 connects to the negative leg the second terminal of the motor 39. Two additional switches, 40 and 41, which are kept in engagement with the surfaces of the cams 26 and 27, respectively, connect, instead, to the positive leg the second terminal of the motor 39 and the first terminal of same motor 39 to the negative leg.

The projections of the cams 22–27 are such as to originate the following sequence of steps: closure of switch 36, closure of switch 34 and subsequent opening thereof, simultaneous closure of the switches 37 and 38 (the projections 30 and 31 are equal to one another and in phase with respect to one another), and subsequent simultaneous reopening thereof, closure and subsequent reopening of switch 35, simultaneous closure and subsequent simultaneous reopening of switches 40 41 (also the projections 32 and 33 are equal and in phase with respect to one another), reopening of the switch 36, whereas the pushbutton 42 is closed manually and opens immediately upon the finger pressure thereon being released.

This sequence of actions determines the following operation for the machine of FIG. 1: once the pushbutton 42 has been depressed for a time sufficient to enable the motor 21 to drive the cam 43 beyond the position which corresponds to the engagement of switch 36 with the recess 44, the motor 21 is fed during the entire duration of the remaining portion of the cycle and continues to drive the cams to rotation in the directions shown by the respective arrows. As the projection 28 of cam 22 closes the switch 34, the magnetic valve 19 is energized and opens the duct 18, thus starting the feed of carbonated water to the collecting vessel 16. Once the engagement with the projection 28 ceases, the switch 34 is reopened (the circumferential width of the projection 28 thus determines the unit-dosage of carbonated water) and the magnetic valve 19 is deenergized to cut off the duct 18. The switches 37 and 38 are then closed so that the motor 39 starts its rotation in such a direction as to bring the punching tool 7 to the position of FIG. 1, so that the needle 9 pierces the cartridge 4. Once the switches 37 and 38 have been reopened (so that the punching tool 7 is stopped in the position shown in FIG. 1), the switch 35 is closed so that the magnetic valve 15 is energized and opens the duct 12. Pressurized fluid is then fed to the cartridge 4 and its pressure drives the substance contained in the cartridge to the exterior so that it falls into the vessel 16 where it becomes admixed with the carbonated water which has been introduced previously (it should be noticed that the lower end of the cartridge could have been cut previously, or it may be opened as the fluid issues from the duct 12, due to the pressure thereof). As the switch 35 is closed again and the magnetic valve 15 is thus deenergized, the switches 40 and 41 are closed, so that the motor 39 starts its motion in a direction opposite to the previous one, that is, so as to lift the punching tool 7 with respect to the position of FIG. 1, thus enabling the cartridge to be removed. A short time thereafter, the switches 40 and 41 are reopened and the motor 39 is stopped. Finally, as the switch 36 engages the recess 44 of cam 43, it opens and also the motor 21 is stopped, so that the machine comes to standstill.

The machine shown in FIG. 3 is but an extension of the machine of FIG. 1, since only two additional ducts 45 and 46 have been provided, which are also in communication with the central bore 11 of the punching tool 7 (it should be noticed that in FIG. 3 reference numerals similar to those of FIG. 1 have been used to denote corresponding component parts of the machines in the two figures). Also these ducts each have a stiff portion 47 and 48, respectively and a flexible portion 49, 50 respectively and, moreover, they are equipped with their respective, independently operable, cutoff magnetic valves 51 and 52. The ducts 45 and 46 can be used for feeding the cartridge with hot and cold, nonaerated water, which, by being admixed with the substance contained in the cartridge, permit the brewing of a number of drinks, such as coffee, milk, cold nonaerated beverages and the like.

What is claimed is:

1. A machine for the production of aerated beverages with flavoring substances contained in prefabricated cartridges, comprising a supporting member for a cartridge containing a flavoring substance to be admixed with carbonated water for the preparation of a beverage, a collecting vessel situated beneath said cartridge, means for directly feeding carbonated water into said collecting vessel, means operable to perforate the upper end of the cartridge and introduce a fluid into the cartridge to force said flavoring substance from said cartridge into the collecting vessel for admixture with the carbonated water previously fed into said collecting vessel.

2. The machine according to claim 1, in which the fluid introduced into the cartridge is a pressurized gas.

3. The machine according to claim 2, in which said gas is carbon dioxide.

4. The machine according to claim 1, in which the fluid introduced into the cartridge is water under pressure existing in a water main.

5. The machine according to claim 1, in which the fluid introduced into the cartridge is compressed air.

6. The machine according to claim 1, in which the fluid introduced into the cartridge is air under atmospheric pressure.

7. The machine according to claim 1 in which said operable means includes a tool mounted for movement toward and away from the supported cartridge, and a hollow needle carried by the tool for perforating the upper end of the cartridge.

8. The machine according to claim 7, in which said tool has a through-bore which communicates with outlet perforations of the hollow needle and with a duct for the fluid which forces the flavoring substance from the cartridge, respectively, and valve means to open and close the duct.

9. The machine according to claim 8, in which the lower end of the cartridge is kept closed by a force which is less than the opening force imparted by the fluid introduced into the cartridge.

10. The machine according to claim 8, in which the lower end of the cartridge is provided with a removable extension for opening the cartridge at its bottom portion.

11. The machine according to claim 10, in which the dimensions of the outer perimeter of the cartridge and the inner perimeter of the supporting member are such as to cause the cartridge to adhere closely to the inner perimeter of the supporting member.

12. The machine according to claim 11, in which the lower end of the cartridge projects beyond the supporting member.

13. The machine according to claim 8 including a valve for opening and closing the feeding means for the carbonated water, first control means operative for opening the valve for the carbonated water feeding means to permit water to flow into the collecting vessel and for closing said valve when the desired amount of water has entered the vessel, second control means operative after closing of said valve for the carbonated water feeding means to move the tool toward the cartridge so that the needle perforated the upper end of the cartridge, third control means operative to open the valve means for the duct for the fluid for introducing the fluid into the cartridge via the through-bore and outlet perforations, and further control means operative to close the valve means for the fluid duct and move the tool away from the cartridge to allow removal of the cartridge from the support.

14. The machine according to claim 13, in which additional ducts for introducing into the interior of the cartridge a number of different liquids communicate with said through-bore of the tool.

15. The machine according to claim 14, in which each of said additional ducts is provided with an independently operable valve for opening and closing said additional duct.

16. The machine according to claim 15 in which one of said additional ducts introduces cold, nonaerated water.

17. The machine according to claim 15 in which another of said additional ducts introduces hot water.

* * * * *